Dec. 8, 1942.                E. A. LARSSON                2,304,762
                               TROLLEY TENDER
                          Filed April 9, 1941           2 Sheets-Sheet 1
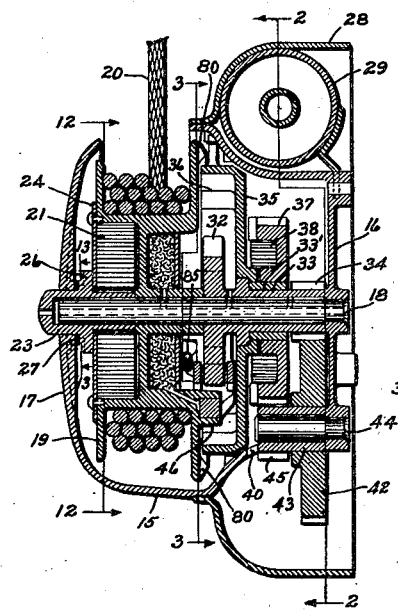
FIG. 1.
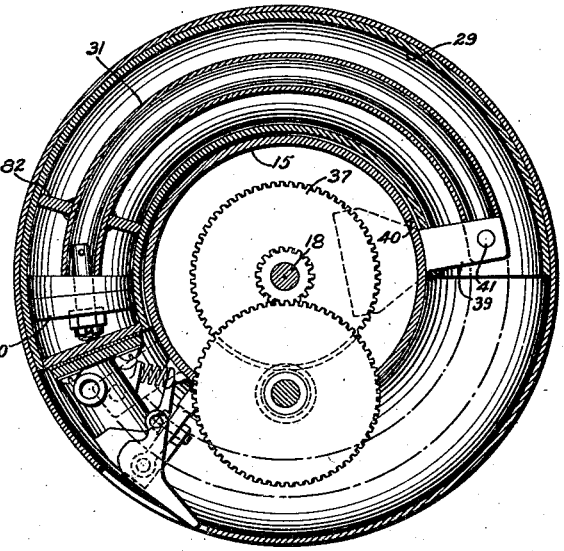
FIG. 2.
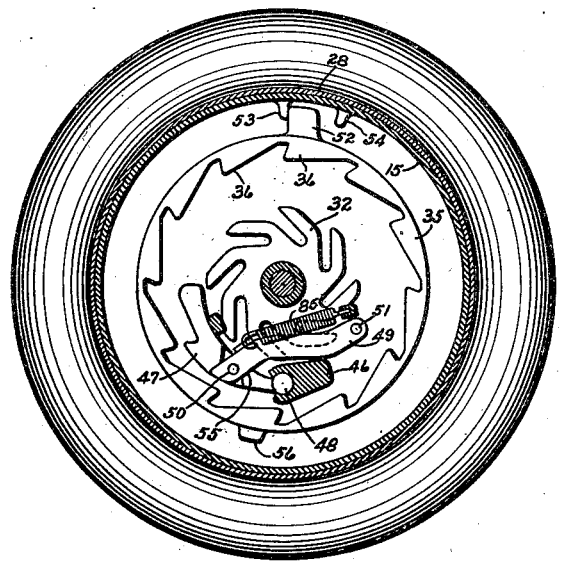
FIG. 3.
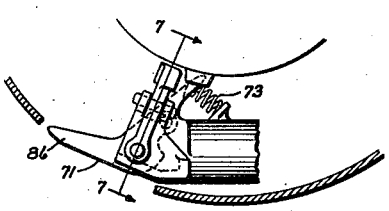
FIG. 5.
FIG. 6.
Inventor
ERNST A. LARSSON
By Alpheus J. Crane
Attorney Dec. 8, 1942.  E. A. LARSSON  2,304,762
TROLLEY TENDER
Filed April 9, 1941   2 Sheets-Sheet 2

Inventor
ERNST A. LARSSON
By Alpheus J. Crane
Attorney

Patented Dec. 8, 1942

2,304,762

UNITED STATES PATENT OFFICE 2,304,762

TROLLEY TENDER

Ernst A. Larsson, Mansfield, Ohio, assignor to The Ohio Brass Company, Mansfield, Ohio, a corporation of New Jersey Application April 9, 1941, Serial No. 387,581

15 Claims. (Cl. 191—90)

This invention relates to trolley tenders including means for arresting the upward movement of a trolley pole and collector in case the collector leaves the conductor for any reason and means for quickly lowering the collector to a point below the overhead trolley structure.

One object of the invention is to provide a trolley tender which will maintain slight tension on the trolley rope, which will quickly arrest upward movement of the trolley pole in case the collector leaves the conductor, which will quickly retrieve the trolley pole to a point below the overhead structure by drawing in the trolley rope and in which fluid pressure means is employed for operating the retriever.

A further object of the invention is to provide a trolley tender which may be easily reset after a retrieving operation without the necessity of the operator exerting tension on the trolley rope to rewind the retrieving mechanism.

A further object of the invention is to provide a trolley tender including fluid pressure actuating means for operating the retriever which may be enclosed in a compact housing of streamline appearance.

A further object of the invention is to provide a device of the class named which shall be of improved construction and operation.

Other objects and advantages will appear from the following description.

The invention is exemplified by the combination and arrangement of parts shown in the accompanying drawings and described in the following specification and it is more particularly pointed out in the appended claims.

In the drawings:

Fig. 1 is a vertical sectional view of a trolley tender showing one embodiment of the present invention.

Fig. 2 is a vertical section approximately on line 2—2 of Fig. 1.

Fig. 3 is a vertical section approximately on line 3—3 of Fig. 1.

Fig. 5 is a fragmentary sectional view approximately on the line 5—5 of Fig. 4.

Fig. 6 is a fragmentary sectional view on line 6—6 of Fig. 5.

Figure 12:
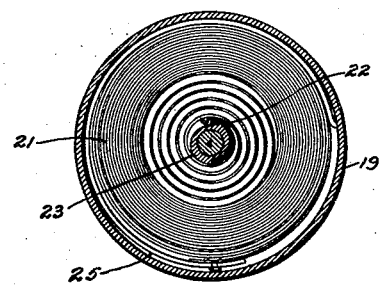
Fig. 12 is a section on line 12—12 of Fig. 1.

The form of the invention shown in the drawings comprises a housing 15 with end plates 16 and 17 having a fixed shaft 18 centrally supported between the end plates. A reel 19 is journaled on the shaft 18 and is provided with the usual trolley rope 20 which is attached to an overhead trolley pole and collector arranged to travel on an overhead conductor. The end of the reel 19 is provided with a recess containing a spring 21, the inner end of the spring being provided with ratchet connection 22 with a bearing sleeve 23 as shown more clearly in Fig. 12. The bearing sleeve 23 is journaled in an opening in the end plate 17 and is rotatably mounted on the end of the shaft 18, as shown in Fig. 1. The recess for the spring 21 may be closed by a plate 24. The outer end of the spring 21, as shown in Fig. 12, is provided with a friction plate 25 which bears against the inner surface of the wall of the recess in the reel 19. The bearing sleeve 23 is provided with a flange 26 having ratchet teeth in its outer face engaging a ratchet washer 27 interposed between the flange 26 and the inner face of the plate 17. The ratchet mechanism between the sleeve 23 and the housing plate 17 permits counterclockwise rotation of the bearing sleeve as viewed from the left in Fig. 1 but prevents reverse rotation thereof. The ratchet mechanism between the spring 21 and the sleeve 23 permits counterclockwise rotation of the spring on the sleeve if viewed from the left in Fig. 1, but prevents reverse rotation. Tension in the spring 21 resists unwinding of the rope 20 on the reel 19 and maintains a slight tension on the rope for normal up and down movement of the trolley collector as it travels along the conductor.

Extending partially around the outer periphery of the housing 15 and enclosed by a covering plate 28 is an arc-shaped fluid pressure tube 29 in which travels a fluid pressure actuated piston 30 having a hollow piston rod 31 connected thereto. The tube 29 and piston rod 31 are curved about the axis of the shaft 18. Means is provided for connecting the piston rod 31 to the reel 19 for rewinding the rope 20 on the reel to retrieve the trolley pole whenever the collector accidentally leaves the conductor. This connecting means includes a sprocket 32 formed integrally with a sleeve 33 journaled on the shaft 18. Integral with the sleeve 33 is a pinion 34 at the end of the sleeve opposite the sprocket 32. Journaled on the sleeve 33 between the sprocket 32 and pinion 34 is a pan-shaped ratchet plate 35 having ratchet teeth 36 on the inner face of its outer peripheral flange. Adjacent the ratchet plate 35 and also journaled on the sleeve 33 is a spur-gear 37 having a recess in the face thereof adjacent the ratchet plate containing a spiral spring 38, one end of which is secured to the gear, and the other end to the ratchet plate. The openings through the plate 35 and gear 37 are large enough to permit the passage of sprocket 34 and a two piece bushing 33' surrounds the sleeve 33. An arm 39 is fixed to the gear 37 and projects radially through a slot 40 in the housing member 15. The outer end of the arm 39 is off-set to bring it into registration with the axis of the piston rod 31 and is secured to the piston rod 31 by a rivet 41. The pinion 34 meshes with a spur-gear 42 secured to a sleeve 43 journaled on a stud shaft 44 fixed to the end plate 16. A pinion 45 is fixed to the sleeve 43 and meshes with the spur-gear 37.

Centrifugally controlled mechanism is provided for connecting the sprocket wheel 32 with the reel 19 whenever the reel is rotated rapidly in a clockwise direction as viewed in Fig. 3, as when the current collector leaves the conductor. This mechanism is shown in Figs. 1 and 2 and comprises a lug 46 projecting from the face of the reel 19 and having a dog 47 journaled at 48 therein. A sprocket engaging bail 49 is pivoted at 50 on the dog 47 and is provided with a cross-bar 51 for engaging the teeth of the sprocket wheel 32. Whenever the reel 19 with the lug 46 thereon is rotated rapidly in a clockwise direction as viewed in Fig. 3, the dog 47 will be moved outwardly by centrifugal force and will engage the teeth 36 of the ratchet plate 35. The ratchet plate 35 is provided with a radial projection 52 normally held against the stop 53 on the housing 15 by the spring 38 but is movable a short distance in a clockwise direction until arrested by the stop 54. When the projection 52 engages the stop 54 the rotation of the reel will be arrested thus stopping the unwinding of the rope and the upward movement of the trolley pole. The outward movement of the dog 37 will cause the bail 49 to move inwardly into position to be engaged by the teeth of the sprocket 32. The dog 47 is provided with a shoulder 55 which engages the arm of the bail 49 and rotates the bail inwardly when the dog moves outwardly. Diametrically opposite the projection 52 on the ratchet plate 35 is a second projection 56 which, upon rotation of the ratchet plate by the dog 47, operates valve mechanism to be described for admitting fluid pressure to the arcuate tube 29 in the rear of the piston 30 to move the piston and its connected piston rod through an arc of approximately 155°. This will drive the sprocket 32 approximately five complete turns through the gear train previously described, the sprocket moving in a counterclockwise direction, as viewed in Fig. 3. At the beginning of the rotation of the sprocket, the teeth will engage the cross-bar of the bail 49 and consequently rotate the reel 19 approximately five complete turns. This is sufficient to retrieve the trolley pole to a position out of danger from overhead construction.

Figure 4:
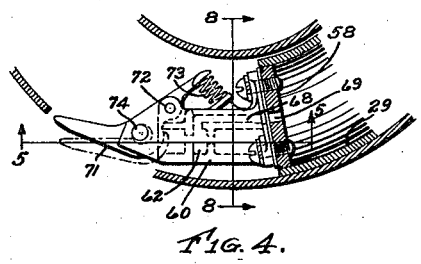
Fig. 4 is a fragmentary sectional view approximately on line 4—4 of Fig. 5 showing the control valve for the fluid pressure actuated piston.
Figure 7:
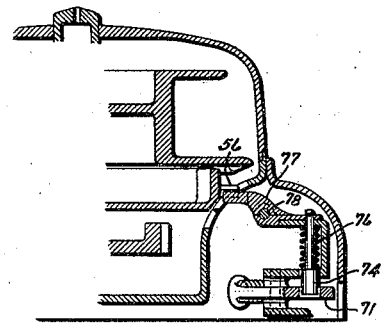
Fig. 7 is a transverse sectional view on line 7—7 of Fig. 6.
Figure 8:
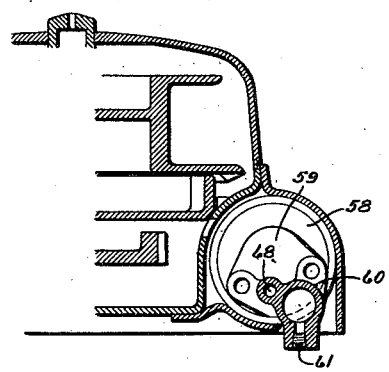
Fig. 8 is a transverse sectional view on line 8—8 of Fig. 4.
Figure 9:
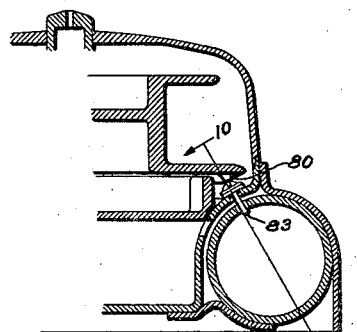
Fig. 9 is a fragmentary sectional view through the pressure tube showing the anti-rebound and reset interlock.
Figure 10:
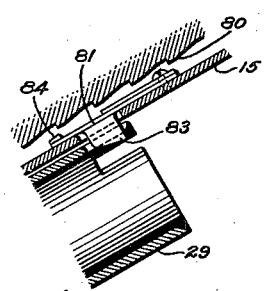
Fig. 10 is a fragmentary section substantially on line 10—10 of Fig. 9.
Figure 13:
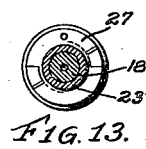
Fig. 13 is a section on line 13—13 of Fig. 1.
Figure 11:
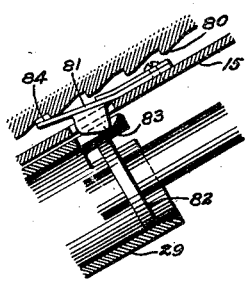
Fig. 11 is a section similar to Fig. 10 but showing the interlock in its operating position.

The valve mechanism for controlling the movement of the piston 30 is shown in Figs. 2, 4, 5, 6, 7 and 8. One end of the fluid pressure tube 29 is closed by a disk 58 to which is secured a web 59 which carries a valve housing 60. The valve housing 60 as shown in Fig. 5 is provided with an intake opening 61 which may be connected with a source of compressed air or other operating fluid pressure. Within the housing 60 is a chamber 62 having an intake port 63 and an exhaust port 64 controlled by valves 65 and 66 respectively connected by a valve stem 67. A spring 65a normally holds the valve 65 closed. The chamber 62 as shown in Fig. 4 is connected by a passage 68 with an opening 69 to the interior of the tube 29. An operating cam 71 is pivoted at 72 on a pair of lugs projecting from the housing 60 and is provided with a spring 73 tending to move the cam into contact with the valve 66 to open the port 63 and close the port 64. The cam 60 is normally locked in an inoperative position by a plunger 74 which extends through an opening 75 and holds the cam in its retracted position against the pressure of the spring 73. The plunger 74 is urged forward by a spring 76 but may be retracted by a lever 77 pivoted at 78 between lugs projecting from a bracket 79 mounted on the valve housing 60. The end of the lever 77, as shown in Fig. 7, projects into the path of the radial extension 56 on the ratchet plate 35 so that when the ratchet plate 35 is shifted in a clockwise direction, as seen in Fig. 3, until it is arrested by the stop 54 the projection 56 operates the lever 77 to release the cam 71 and open the valve port 63 and close the valve port 64. This will cause fluid pressure to enter the arcuate tube 29 and operate the piston 30 to rotate the reel 19 as previously described. The movement of the piston rod 31 and rotation of the gear mechanism connected with the arm 39 is arrested by contact between the arm 39 and the web 59 after the piston has moved approximately 155° and the reel has been rotated approximately five turns, as heretofore explained.

To prevent rebound of the retrieving mechanism the reel 19 is provided on the outer periphery of one of its flanges with ratchet teeth 80 and a spring detent 81 is secured to the housing 15 adjacent the open end of the tube 29 in position to engage the ratchet teeth 80 when the piston is moved to the end of its path of movement. The detent 81 is operated by a disk 82 secured to the piston rod 31 which helps to guide the piston rod and which engages a cam member 83 on the detent 81 to press the toothed end 84 of the detent 81 into engagement with the ratchet teeth 80 and prevent rebound of the reel and hold the reel from rotation until released.

As seen as the bail 49 is engaged by the sprocket wheel 32 at the beginning of a retrieving operation, the dog 47 will be drawn inwardly out of engagement with the ratchet teeth 36 by its spring 85 and by the tension on the bail 49 but the bail will be held in engagement with the ratchet teeth by the projecting ends of the teeth and by the force exerted by the sprocket wheel upon the bail. As soon as the dog 47 is disengaged from the teeth 36, the projection 52 on the ratchet plate 35 will be returned and the contact with the stop 53 by the tension in the spring 38 and rotation of the gear 37 will continue to increase the tension in the spring throughout the retrieving operation. When it is desired to reset the retrieving mechanism, it is only necessary for the operator to press inwardly on the extension 86 of the operating cam 71 to retract the cam against the force of the spring 73 until the plunger 74 reengages the opening 75 and locks the cam in its inoperative position. This will close the intake port 63 and open the exhaust port 64 so that fluid pressure in the tube 29 will be exhausted. The tension in the spring 38, built up during the retrieving operation, will return the piston to its initial position and permit the tension in the rope 20 exerted by the trolley pole to unwind the rope so that the collector may be returned into contact with the trolley wire. During this operation it is only necessary for the operator to direct the collector on to the trolley wire and it is not necessary for him to pull outwardly on the rope since the only resistance to unwinding of the rope is exerted by the take-up spring 21 which, of course, is readily overcome by the trolley pole spring since the spring 21 only has sufficient tension to take up the slack in the rope 20 as the trolley pole moves up and down under normal operation. The reverse rotation of the sprocket wheel 32 caused by the return of the piston 30 will release the bail 49 from the sprocket wheel whereupon the spring 85 will return the bail to its outermost position away from the sprocket wheel.

During the retrieving operation, the reel 19 is rotated in a counterclockwise direction, as viewed in Fig. 12 and from the left in Fig. 1. The first effect of this rotation will be to release all tension in the spring 21 and after the tension has been released, the spring 21 will move upon its ratchet connection 23 or the sleeve 23 may be rotated on its ratchet connection 27, if the amount of rotation of the reel is more than sufficient to release the tension in the spring 21. When the retrieving mechanism is reset, the reel will be rotated in the reverse direction to restore the tension to the spring 21. However, if the spring or sleeve has been rotated relative to their ratchet mechanism during the retrieving operation, the amount of tension restored to the spring will be greater than that originally in the spring. This will insure full tension in the spring after a retrieving operation. In order to prevent too great a tension being built up in the spring, the friction shoe 25 is provided so that if excess tension should occur this will be relieved by slipping of the shoe within the flange of the reel 19. It will thus be seen that a trolley tender is provided which is entirely automatic in its operations and which after a retrieving action requires merely the pressing of a lever and direction of the collector shoe into contact with the trolley conductor to effect resetting of the tender.

I claim:

1. In a trolley tender, a reel, a fluid pressure motor comprising a pressure chamber and a piston movable therein for actuating said reel, an anti-rebound lock for said reel and means operable by said piston at one end of its path of travel for operating said anti-rebound lock.

2. In a trolley tender, a reel, means for driving said reel, means to hold said reel against more than a predetermined rotation when a sudden tension is applied to the rope wound on said reel, manually operated means for deenergizing said driving means to facilitate return thereof, an anti-rebound lock for said reel and a spring placed under tension by said driving means to restore said driving means when deenergized.

3. In a trolley tender, a reel, a trolley rope on said reel, a spring for rotating said reel to take up slack in said rope, the force exerted by said spring and said rope being normally less than the tension exerted by the trolley pole on said rope so that the current collector is held in contact with a conductor by the force exerted by said trolley pole against the force exerted by said spring, a power drive for rotating said reel in a direction to wind the rope thereon against the tension exerted by said trolley pole, an anti-rebound lock for said reel operatively associated with said power drive, means to hold said reel against more than a predetermined rotation when a sudden tension is applied to the rope wound on said reel, and means for freeing said reel from said power drive to permit said rope to unwind under the differential tension of said spring and pole on said rope.

4. In a trolley tender, a reel, a take up spring for said reel, a fluid pressure drive for rotating said reel to wind a rope thereon, centrifugally operated means for connecting said reel with said drive when said reel rotates rapidly in an unwinding direction, a valve controlled by said centrifugally operated means for admitting fluid pressure to said drive to actuate said drive and wind the rope on said reel to retrieve the trolley pole when it escapes an anti-rebound device for said reel operatively associated with said fluid pressure device, means to hold said reel against more than a predetermined rotation when a sudden tension is applied to the rope wound on said reel, and manually operable means for opening said valve to permit return of said trolley pole.

5. In a trolley tender, a reel, a trolley rope on said reel a take up spring for said reel, a fluid pressure drive for rotating said reel to wind said rope thereon to retrieve an escaped trolley pole, a centrifugal dog on said reel, a ratchet plate engaged by said dog when said dog is operated by rapid unwinding of said rope from said reel by an escaped trolley pole, a fluid pressure drive for said reel, a valve for controlling said drive, means operated by said ratchet plate when engaged by said dog for opening said valve, a stop for said plate for limiting unwinding rotation of said reel when said ratchet plate is engaged by said dog, means operated by said dog for connecting said reel to said drive to wind said rope on said reel and retrieve said trolley pole, a spring placed under tension during operation of said drive for restoring said drive, an anti-rebound device for said reel operatively associated with said fluid pressure device and manually operable means for opening said valve to permit said spring to restore said drive and release said reel from said drive.

6. In a trolley tender; a reel; means to keep a rope wound on said reel in tension; means to retrieve said trolley comprising a pressure fluid operated motor operatively connected to said reel; means to hold said reel against unwinding when a sudden upward pull is imposed on said rope wound on said reel; means controlled by said reel to introduce pressure fluid to said motor; means to prevent rebound of said reel and means operable by said motor to actuate said last mentioned means.

7. In a trolley tender; a reel rotatably mounted therein; means to prevent said reel from unwinding a rope on said reel when said trolley is suddenly raised; a pressure fluid motor concentrically disposed of the axis of said reel to retrieve said reel; means to transmit motive power from said motor to said reel; centrifugally operated means to connect said last mentioned means to said reel; valve means controlled by said centrifugal means to introduce pressure fluid to said motor; means to hold and prevent rebound of said reel after it has been retrieved by said motor and means to release said motor from said reel.

8. In a trolley tender; a reel rotatably mounted therein; a rope on said reel; means to keep said rope wound on said reel during normal operation; pressure fluid operated means to retrieve said reel when a sudden tension has been imposed on said rope; means to hold said reel against more than a predetermined unwinding upon the imposition of said sudden tension on said rope; centrifugally operated means to operatively associate said reel and said pressure fluid means and introduce pressure fluid to said pressure fluid operated means; and means to hold and prevent rebound of said reel operatively associated with said pressure fluid means when said reel has been retrieved.

9. In a trolley tender; a reel rotatably mounted therein; means to hold a rope wound on said reel in tension as a trolley attached thereto is normally raised and lowered; an arcuate shaped pressure fluid motor to retrieve said reel; a transmission to connect said reel to said motor; centrifugally actuated means to operatively associate said transmission with said reel when a sudden tension is applied to said rope; means to prevent an excessive unwinding of said reel when said sudden tension is applied and means operated by said motor to hold and prevent rebound of said reel when said motor has retrieved said means.

10. In a trolley tender; a reel; a rope wound on said reel; means to keep said rope in tension as a trolley connected thereto is normally raised and lowered; a pressure fluid actuated motor disposed about the axis of said reel; a transmission extending from said reel to said motor; means to connect said transmission to said reel when a sudden upward tension is applied to said rope and motor operated means to hold and prevent rebound of said reel against rotation after being retrieved by said motor.

11. In a device as defined in claim 10, which includes means to manually release said reel holding means and permit said motor to return to its original position.

12. In a trolley tender; a reel; a rope on said reel; means to keep said rope under light tension during normal operation; a pressure fluid motor disposed about the axis of said reel and operatively connected thereto, centrifugally operated means to actively connect said reel to said motor when said reel is given a sudden rotational start, such that said reel may be retrieved; a valve actuated by said centrifugally operated means to introduce pressure fluid to said motor; and motor operated means to hold and prevent rebound of said reel when it has been retrieved by said motor.

13. In a device as defined in claim 12 which includes means to prevent more than a predetermined rotation of said reel when given a sudden rotational start.

14. In a trolley retrieving device, a reel; a rope wound on said reel and connected to said trolley; means to keep said rope in tension as said trolley is normally raised and lowered; an independently actuated motor to retrieve said trolley when it accidentally leaves a trolley wire; centrifugally controlled means to connect said motor and said reel; means actuated by said last mentioned means to energize said motor to retrieve said trolley; and means controlled by said motor to hold and prevent rebound of said reel when said trolley has been retrieved.

15. In a trolley tender; a reel rotatably mounted therein; means to prevent a rope wound on said reel from being unwound when a sudden upward tension is applied thereto; a pressure fluid motor to retrieve said reel; centrifugally operated means to connect said motor with said reel when a sudden tension is applied to said rope; means to prevent an excessive unwinding of the rope when said sudden tension is applied thereto; means to apply pressure fluid to said motor when said sudden tension is applied; and means operable by said motor to hold and prevent rebound of said reel when said motor has retrieved said reel.

ERNST A. LARSSON.